United States Patent
Kashima et al.

(10) Patent No.: US 8,320,744 B2
(45) Date of Patent: Nov. 27, 2012

(54) VIDEO SIGNAL PROCESSING DEVICE, VIDEO SIGNAL PROCESSING METHOD, VIDEO SIGNAL ENCODING DEVICE, VIDEO SIGNAL ENCODING METHOD, AND PROGRAM

(75) Inventors: Koji Kashima, Tokyo (JP); Satoru Kuma, Tokyo (JP); Masashi Eshima, Tokyo (JP); Takuya Kitamura, Tokyo (JP)

(73) Assignee: Sony Corporation, Tokyo (JP)

( * ) Notice: Subject to any disclaimer, the term of this patent is extended or adjusted under 35 U.S.C. 154(b) by 927 days.

(21) Appl. No.: 12/307,666

(22) PCT Filed: Jul. 13, 2007

(86) PCT No.: PCT/JP2007/063947
§ 371 (c)(1),
(2), (4) Date: Jan. 6, 2009

(87) PCT Pub. No.: WO2008/007756
PCT Pub. Date: Jan. 17, 2008

(65) Prior Publication Data
US 2009/0202219 A1 Aug. 13, 2009

(30) Foreign Application Priority Data

Jul. 13, 2006 (JP) ................. 2006-193126

(51) Int. Cl.
*G11B 27/00* (2006.01)
*H04N 9/80* (2006.01)
*H04N 5/94* (2006.01)
*H04N 9/88* (2006.01)
(52) U.S. Cl. .................. 386/278; 386/239; 386/263
(58) Field of Classification Search .................. 386/231, 386/239–248, 278–290, 263
See application file for complete search history.

(56) References Cited

U.S. PATENT DOCUMENTS

| | | | |
|---|---|---|---|
| 6,529,550 B2 | 3/2003 | Tahara et al. | |
| 6,567,471 B1 | 5/2003 | Yoshinari | |
| 7,162,093 B2 * | 1/2007 | Regunathan et al. | 382/233 |
| 2002/0114397 A1 * | 8/2002 | Todo et al. | 375/240.29 |
| 2003/0091330 A1 | 5/2003 | Shibutani | |
| 2004/0030665 A1 * | 2/2004 | Sullivan | 706/48 |

(Continued)

FOREIGN PATENT DOCUMENTS

JP 2001 157161 6/2001

(Continued)

*Primary Examiner* — Thai Tran
*Assistant Examiner* — Hung Dang
(74) *Attorney, Agent, or Firm* — Oblon, Spivak, McClelland, Maier & Neustadt, L.L.P.

(57) ABSTRACT

The present invention relates to a video signal processing apparatus and video signal processing method, a video signal encoding apparatus and video signal encoding method, and a program which can solve an EPB problem involved when an encoded video signal is subjected to smart rendering editing. In an extraction process, if EPB problem occurrence prevention countermeasures have been taken in an H.264/AVC stream, smart rendering editing is performed without monitoring the occurrence of an EPB problem. If the countermeasures have not been taken, smart rendering editing is advanced while monitoring the occurrence of an EPB problem. And, in a case where an EPB problem of insertion of an EPB has occurred, a filler or a predetermined parameter corresponding to the inserted EPB is deleted. In a case where an EPB problem of deletion of an EPB has occurred, a filler corresponding to the deleted EPB is inserted. The present invention can be applied to a device that processes a video signal using the H.264/AVC scheme.

5 Claims, 6 Drawing Sheets

U.S. PATENT DOCUMENTS

| | | |
|---|---|---|
| 2005/0007263 A1* | 1/2005 | Zhou .................. 341/55 |
| 2006/0045188 A1 | 3/2006 | Fuchie |
| 2006/0045467 A1 | 3/2006 | Fuchie |
| 2007/0041441 A1 | 2/2007 | Koyabu et al. |
| 2007/0286289 A1 | 12/2007 | Arai et al. |
| 2008/0019444 A1 | 1/2008 | Fuchie et al. |
| 2008/0056383 A1 | 3/2008 | Ueki et al. |

FOREIGN PATENT DOCUMENTS

| | | |
|---|---|---|
| JP | 2003 153200 | 5/2003 |
| JP | 2003 199057 | 7/2003 |
| JP | 2004 104361 | 4/2004 |
| JP | 2005 245002 | 9/2005 |
| JP | 2006 502605 | 1/2006 |

* cited by examiner

VIDEO SIGNAL PROCESSING DEVICE, VIDEO SIGNAL PROCESSING METHOD, VIDEO SIGNAL ENCODING DEVICE, VIDEO SIGNAL ENCODING METHOD, AND PROGRAM

TECHNICAL FIELD

The present invention relates to a video signal processing apparatus and video signal processing method, a video signal encoding apparatus and video signal encoding method, and a program, and more specifically, to a video signal processing apparatus and video signal processing method, a video signal encoding apparatus and video signal encoding method, and a program which allow editing of an encoded video signal on a frame-by-frame basis without completely decoding it.

BACKGROUND ART

For example, in a case where editing is performed so as to extract a predetermined section from a video signal compressed and encoded using the MPEG2 method or the like (hereinafter referred to as an encoded video signal), when extraction is performed in units of a GOP (Group of Pictures), the editing can be performed with a comparatively small amount of computation without decoding the encoded video signal.

When extraction is performed in finer units than units of a GOP, namely, in units of a frame, on the other hand, decoding processing is required due to the presence of a reference relationship between pictures. The simplest method is to extract a predetermined section after decoding all encoded data.

However, even though all encoded data is decoded, re-encoding is necessary after the extraction, resulting in possible extra computation and an increase in the time required to complete the series of processes.

Therefore, a technique called smart rendering editing exists as a method for executing editing as rapidly as possible so as to extract a predetermined section in units of a frame from an encoded video signal (see, for example, Patent Document 1).

In the smart rendering editing, for example, in a case where editing is performed to extract an arbitrary section from a sequential encoded video signal as shown in part A of FIG. 1, only GOPs respectively including a leading end and trailing end of the extracted section are individually decoded to extract desired frames which are re-encoded.

Further, in an intermediate portion other than the GOP at the leading end and the GOP at the trailing end of the extracted section, the encoded video signal is extracted as it is without being decoded.

Therefore, in the encoded video signal corresponding to the extracted section after the smart rendering editing, as shown in part B of FIG. 1, portions subjected to re-encoding (re-encoded portions) and a portion that is sandwiched between the re-encoded portions and that is not subjected to re-encoding (intermediate portion) exist. Note that rewriting of a predetermined parameter within the encoded video signal occurs in both the re-encoded portions and the intermediate portion.

Meanwhile, in the current situation, the MPEG2 method is used as a standard video signal compression-encoding method. In the future, however, the prevalence of the H.264/AVC method, which can provide a higher compression ratio than the MPEG2 method without degrading the image quality, is expected to increase.

In the H.264/AVC method, it is specified that in a case where a predetermined data sequence (0x00, 0x00, 0xXX (where XX is 00, 01, 02, or 03)) as shown in part A of FIG. 2 is included in an encoded string obtained by encoding a video signal, as shown in part B of FIG. 2, 0x03, referred to as an EPB (Emulation Prevention Byte), be inserted between 0x00, 0x00 and 0xXX in order to prevent the pseudo-occurrence of start codes (0x00, 0x00, 0x01) specified in the H.264/AVC method. In an H.264/AVC encoded video signal, therefore, a predetermined data sequence has an EPB inserted therein.
Patent Document 1: Japanese Unexamined Patent Application Publication No. 2004-104361

DISCLOSURE OF INVENTION

Technical Problem

As described above, when an encoded video signal is subjected to smart rendering editing, rewriting of a parameter occurs. Thus, when an H.264/AVC encoded video signal is subjected to smart rendering editing, rewriting of a parameter also occurs. The rewriting of the parameter may cause a predetermined data sequences to be modified to cause an EPB, which has been inserted, to disappear because it is no longer necessary, or, conversely, to cause an EPB to be inserted due to the appearance of a predetermined data sequence. In this manner, the disappearance of an EPB or the insertion of an EPB, which is caused by smart rendering editing, is hereinafter referred to as an EPB problem.

In a case where an EPB problem has occurred, the data length of an encoded video signal is changed. Thus, an encoded video signal after being subjected to smart rendering editing would violate a predetermined standard and could not meet Hypothetical Reference Decoder (HRD) conditions.

It is therefore desirable to develop a method which prevents the occurrence of an EPB problem when an encoded video signal is subjected to smart rendering editing and a method of solving an EPB problem that has occurred.

The present invention has been made in view of such a situation, and is intended to prevent the occurrence of an EPB problem, or solve an EPB problem that has occurred, when an encoded video signal is subjected to smart rendering editing.

Technical Solution

A video signal processing apparatus, which is a first aspect of the present invention, is a video signal processing apparatus that performs smart rendering editing of a section specified in units of frames of an encoded video signal, including determining means for determining whether or not EPB problem occurrence prevention countermeasures have been taken in the encoded video signal which has been input; smart rendering editing means for decoding and re-encoding a leading end portion and trailing end portion of the section specified in units of frames of the encoded video signal which has been input, and outputting an intermediate portion not included in the leading end portion or the trailing end portion of the section directly without decoding the intermediate portion; and EPB problem addressing means for detecting occurrence of an EPB problem indicating a first event in which a new EPB is inserted into an edited encoded video signal by rewriting a predetermined parameter in the encoded video signal in accordance with the re-encoding or a second event in which an EPB that has existed before editing disappears, deleting, when the first event has occurred, a filler or predetermined data inserted in advance in the encoded video signal, which corresponds to the inserted EPB, and inserting, when the second event has occurred, a filler corresponding to the EPB that has disappeared into the encoded video signal, wherein the processing of the EPB problem addressing means is omitted when it is determined by the determining means that EPB problem occurrence prevention countermeasures have been taken in the encoded video signal which has been input.

The determining means can determine whether or not the EPB problem occurrence prevention countermeasures have been taken on the basis of information indicating whether or not the EPB problem occurrence prevention countermeasures have been taken, the information being included in the encoded video signal which has been input.

The EPB problem occurrence prevention countermeasures can include a bit length restriction for the predetermined parameter.

A video signal processing method, which is the first aspect of the present invention, is a video signal processing method of a video signal processing apparatus that performs smart rendering editing of a section specified in units of frames of an encoded video signal, including the steps of determining whether or not EPB problem occurrence prevention countermeasures have been taken in the encoded video signal which has been input; performing, regardless of whether or not the EPB problem occurrence prevention countermeasures have been taken, smart rendering editing in which a leading end portion and trailing end portion of the section specified in units of frames of the encoded video signal which has been input are decoded and re-encoded and in which an intermediate portion not included in the leading end portion or the trailing end portion of the section is directly output without being decoded; and executing, only when it is determined that the EPB problem occurrence prevention countermeasures have not been taken, an problem addressing process of detecting occurrence of an EPB problem indicating a first event in which a new EPB is inserted into an edited encoded video signal by rewriting a predetermined parameter in the encoded video signal in accordance with the re-encoding or a second event in which an EPB that has existed before editing disappears, deleting, when the first event has occurred, a filler or predetermined data inserted in advance in the encoded video signal, which corresponds to the inserted EPB, and inserting, when the second event has occurred, a filler corresponding to the EPB that has disappeared into the encoded video signal.

A program, which is the first aspect of the present invention, is a program for controlling a video signal processing apparatus that performs smart rendering editing of a section specified in units of frames of an encoded video signal, the program causing a computer to execute a process including the steps of determining whether or not EPB problem occurrence prevention countermeasures have been taken in the encoded video signal which has been input; performing, regardless of whether or not the EPB problem occurrence prevention countermeasures have been taken, smart rendering editing in which a leading end portion and trailing end portion of the section specified in units of frames of the encoded video signal which has been input are decoded and re-encoded and in which an intermediate portion not included in the leading end portion or the trailing end portion of the section is directly output without being decoded; and executing, only when it is determined that the EPB problem occurrence prevention countermeasures have not been taken, an problem addressing process of detecting occurrence of an EPB problem indicating a first event in which a new EPB is inserted into an edited encoded video signal by rewriting a predetermined parameter in the encoded video signal in accordance with the re-encoding or a second event in which an EPB that has existed before editing disappears, deleting, when the first event has occurred, a filler or predetermined data inserted in advance in the encoded video signal, which corresponds to the inserted EPB, and inserting, when the second event has occurred, a filler corresponding to the EPB that has disappeared into the encoded video signal.

In the first aspect of the present invention, it is determined whether or not EPB problem occurrence prevention countermeasures have been taken in an input encoded video signal; only when it is determined that no EPB problem occurrence prevention countermeasures have been taken, occurrence of an EPB problem indicating a first event in which a new EPB is inserted into an edited encoded video signal by rewriting a predetermined parameter in the encoded video signal in accordance with the re-encoding or a second event in which an EPB that has existed before editing disappears is detected; and when the first event has occurred, a filler or predetermined data inserted in advance in the encoded video signal, which corresponds to the inserted EPB, is deleted. Alternatively, when the second event has occurred, an EPB problem addressing process in which a filler corresponding to the EPB that has disappeared is inserted into the encoded video signal is executed.

A video signal encoding apparatus, which is a second aspect of the present invention, is a video signal encoding apparatus that encodes a video signal according to a predetermined encoding scheme, including setting means for setting, as EPB problem occurrence prevention countermeasures in smart rendering editing, a bit length of a predetermined parameter included in an encoded video signal obtained as a result of encoding to be within a range narrower than a range allowed by the predetermined encoding scheme; and encoding means for encoding the video signal according to a result of the setting, and including, in the encoded video signal obtained as a result of the encoding, information indicating that the bit length of the predetermined parameter is restricted.

The setting means can simulate a data sequence immediately before the predetermined parameter within the encoded video signal, and can set the bit length of the predetermined parameter so that a data sequence into which an EPB is to be inserted does not occur regardless of which value the predetermined parameter is set to.

A video signal encoding method, which is the second aspect of the present invention, is a video signal encoding method of a video signal encoding apparatus that encodes a video signal according to a predetermined encoding scheme, including the steps of setting, as EPB problem occurrence prevention countermeasures in smart rendering editing, a bit length of a predetermined parameter included in an encoded video signal obtained as a result of encoding to be within a range narrower than a range allowed by the predetermined encoding scheme; and encoding the video signal according to a result of the setting, and including, in the encoded video signal obtained as a result of the encoding, information indicating that the bit length of the predetermined parameter is restricted.

A program, which is the second aspect of the present invention, is a program for controlling a video signal encoding apparatus that encodes a video signal according to a predetermined encoding scheme, the program causing a computer to execute a process including the steps of setting, as EPB problem occurrence prevention countermeasures in smart rendering editing, a bit length of a predetermined parameter included in an encoded video signal obtained as a result of encoding to be within a range narrower than a range allowed by the predetermined encoding scheme; and encoding the video signal according to a result of the setting, and including, in the encoded video signal obtained as a result of the encoding, information indicating that the bit length of the predetermined parameter is restricted.

In the second aspect of the present invention, as EPB problem occurrence prevention countermeasures in smart rendering editing, a bit length of a predetermined parameter included in an encoded video signal obtained as a result of encoding is set to be within a range narrower than a range allowed by a predetermined encoding; a video signal is encoded according to a result of the setting; and information indicating that the bit length of the predetermined parameter is restricted is included in an encoded video signal obtained as a result of the encoding.

Advantageous Effects

According to the first aspect of the present invention, an EPB problem that has occurred when an encoded video signal is subjected to smart rendering editing can be solved.

According to the second aspect of the present invention, a video signal can be encoded so as not to cause an EPB problem when smart rendering editing is performed.

Figure 1:
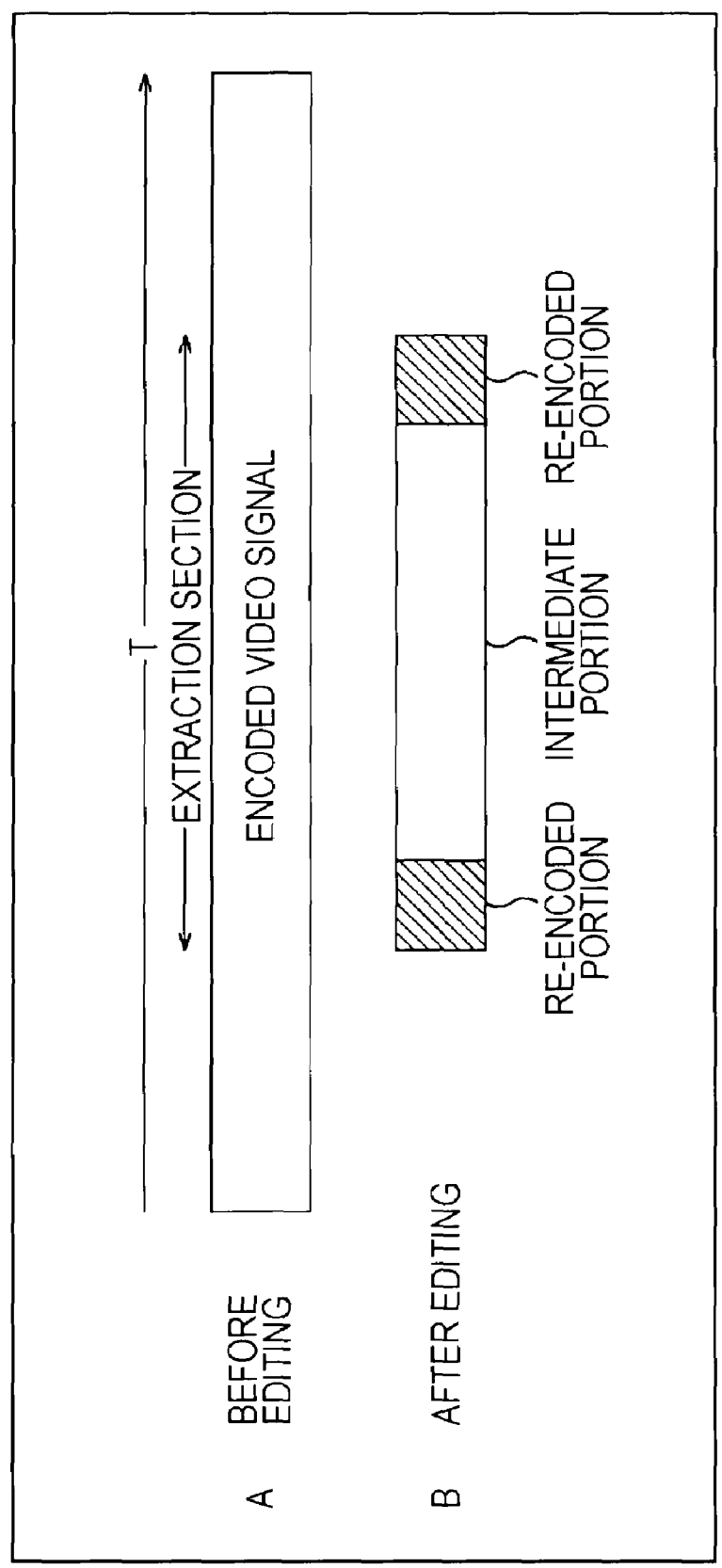
FIG. 1 is a diagram for explaining smart rendering editing.
Figure 2:
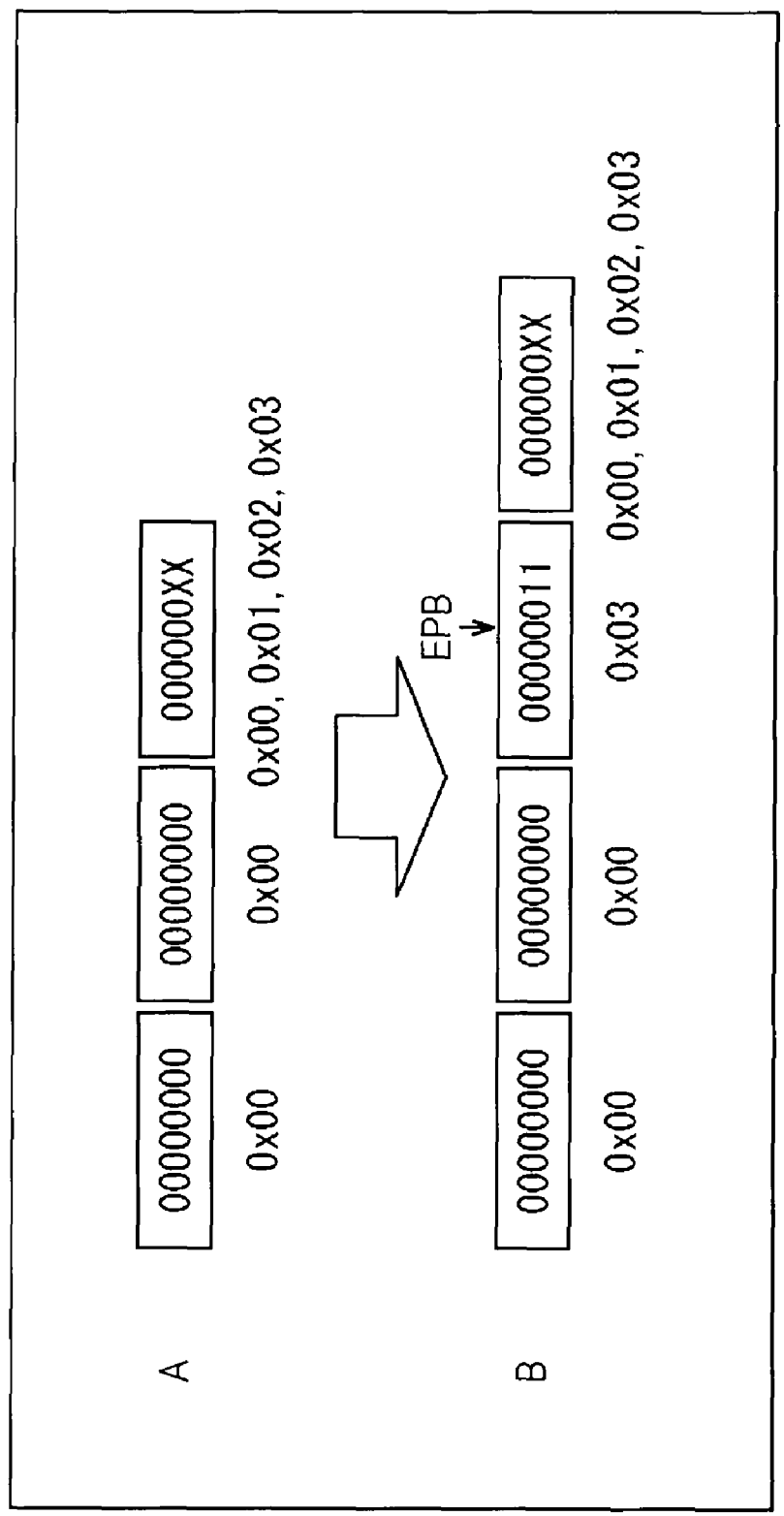
FIG. 2 is a diagram for explaining an EPB problem.

EXPLANATION OF REFERENCE NUMERALS 10 editing apparatus, 11 operation input unit, 12 control unit, 13 switching unit, 14 decoder, 15 encoder, 16 rewriting unit, 50 personal computer, 51 CPU

BEST MODE FOR CARRYING OUT THE INVENTION

A specific embodiment to which the present invention is applied will be explained in detail hereinafter with reference to the drawings.

Figure 3:
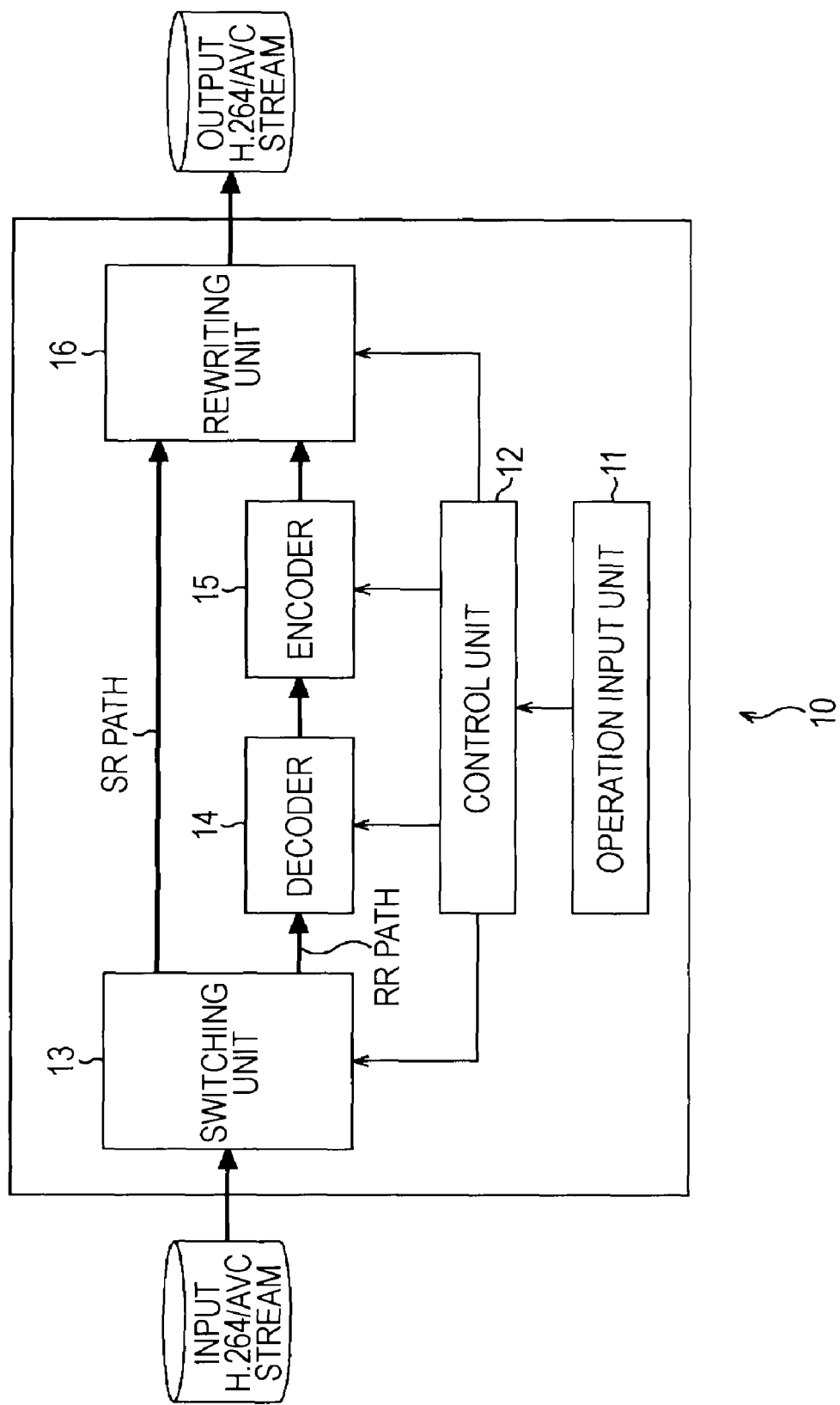
FIG. 3 is a block diagram showing an example structure of an editing apparatus to which the present invention is applied.

FIG. 3 shows an example structure of an editing apparatus, which constitutes an embodiment of the present invention. The editing apparatus 10 is designed to extract, by using smart rendering editing, an arbitrary section specified in units of frames from an encoded video signal (described also as an H.264/AVC stream) encoded according to the H.264/AVC scheme, which is input from a previous stage.

The editing apparatus 10 is composed of an operation input unit 11 that inputs a user's operation for specifying an extraction section, a control unit 12 that controls individual units of the editing apparatus 10, a switching unit 13 that outputs a GOP including a frame at a leading end of the extraction section in the H.264/AVC stream and a GOP including a frame at a trailing end of the extraction section to a re-rendering path and that outputs an intermediate portion not to be re-encoded within the extraction section to a smart rendering path, a decoder 14 that decodes the H.264/AVC stream input through the re-rendering path, an encoder 15 that encodes again a picture included in the extraction section within a video signal obtained as a result of the decoding, and a rewriting unit 16 that rewrites a predetermined parameter in the re-encoded portions and the intermediate portion in accordance with smart rendering editing to output the results to a subsequent stage.

Note that the inputs to the editing apparatus 10 are supposed to include an H.264/AVC stream in which countermeasures against the occurrence of an EPB problem when smart rendering editing is executed (hereinafter referred to as EPB problem occurrence prevention countermeasures, the details of which will be described below) have been taken, and an H.264/AVC stream in which no EPB problem occurrence prevention countermeasures have been taken. It is assumed that an H.264/AVC stream in which the EPB problem occurrence prevention countermeasures have been taken has embedded therein a smart rendering indicator indicating this fact.

Parameters that need to be rewritten in the rewriting unit 16 include at least three parameters as follows:
cpb_removal_delay @ Picture timing SEI (hereinafter referred to as a parameter P1)
frame_num @ Slice header (hereinafter referred to as a parameter P2)
pic_order_cnt_lsb @ Slice header (hereinafter referred to as a parameter P3)

The bit lengths of the parameters P1 to P3 described above are respectively specified by parameters P1' to P3' as follows:
Parameter P1': cpb_removal_delay_length_minus1 @ HRD parameters
Parameter P2': log 2_max_frame_num_minus4 @ Sequence parameter set
Parameter P3': log 2_max_pic_order_cnt_lsb_minus4 @ Sequence parameter set Thus, EPB problem occurrence prevention countermeasures are made so as to restrict the bit length of each of the parameters P1 to P3 to be narrower than a bit length range allowed by the H.264/AVC scheme so that no EPB problems may occur regardless of which value the parameters P1 to P3 are rewritten to.

Note that in addition the bit length restriction of the parameters P1 to P3 described above, the following 1 to 3 items may be added as EPB problem occurrence prevention countermeasures:
1 CpbSize and TraceBitRate are uniformly set so that smart rendering editing can be performed without requiring rewriting in individual modes such as LP, SP, and HQ.
2 SEI is inserted.
 Buffering Period SEI/per GOP
 Recovery Point SEI/per GOP
 Picture Timing SEI per Picture
3 HRD parameter is inserted.

Note that a method of setting the bit length restricted for each of the parameters P1 to P3 will be described below with reference to FIGS. 5 and 6.

Figure 4:
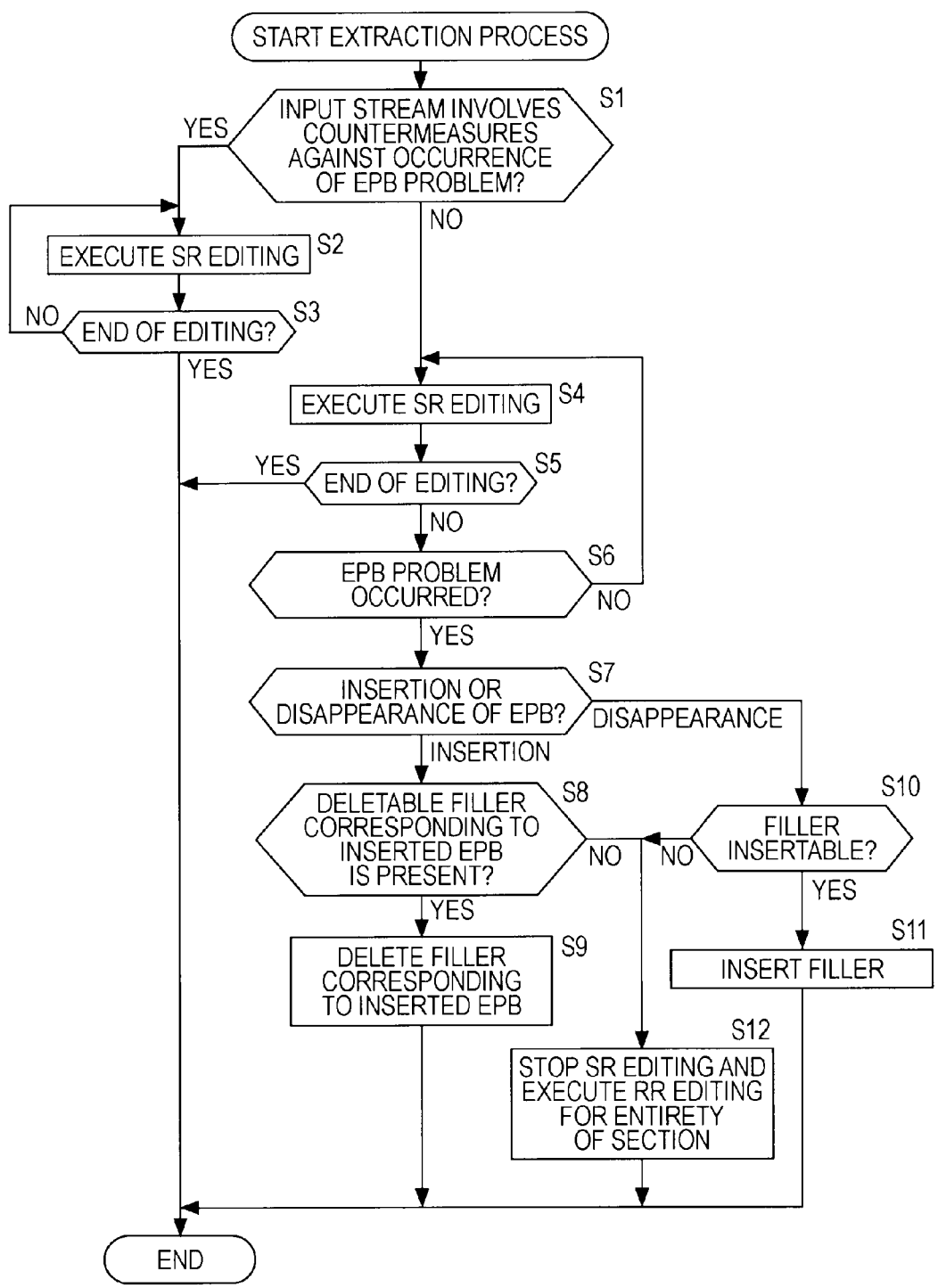
FIG. 4 is a flowchart explaining an extraction process performed by the editing apparatus.

Next, a process of extracting an arbitrary section specified in units of frames from an H.264/AVC stream (hereinafter referred to simply as an extraction process), which is performed by the editing apparatus 10, will be explained with reference to a flowchart of FIG. 4.

Note that, before starting this process, it is assumed that a user has already specified a section to be extracted from a sequential H.264/AVC stream using the operation input unit 11 and that the control unit 12 has been notified of information on this operation.

In step S1, the switching unit 13 detects a smart rendering indicator embedded in the H.264/AVC stream input from the previous stage according to the control of the control unit 12 to determine whether or not EPB problem occurrence prevention countermeasures have been taken. If it is determined that EPB problem occurrence prevention countermeasures have been taken, the process proceeds to step S2, in which smart rendering editing is performed. The smart rendering editing is continuously performed until it is determined in step S3 that the editing process ends.

Specifically, a GOP including a frame at a leading end of an extraction section of an H.264/AVC stream input from the previous stage is output to the decoder 14 through the re-rendering path by using the switching unit 13, and is decoded by the decoder 14. A video signal obtained as a result of the decoding is output to the encoder 15. A picture included in the extraction section within the video signal obtained as a result of the decoding is extracted and encoded again by the encoder 15. The result is output to the rewriting unit 16, and a predetermined parameter is rewritten by the rewriting unit 16, which is then output to the subsequent stage. Note that since the bit length of the parameter to be rewritten is restricted by the EPB problem occurrence prevention countermeasures, no EPB problems can occur.

Then, an intermediate portion in the H.264/AVC stream input from the previous stage, which follows the GOP output to the re-rendering path, is output to the rewriting unit 16 through the smart rendering path. While a predetermined parameter is rewritten in a manner similar to that of the re-encoded portion using the rewriting unit 16, no EPB problems can occur because the bit length of the parameter to be rewritten is restricted by the EPB problem occurrence prevention countermeasures.

Subsequently, the GOP, which follows the intermediate portion output through the smart rendering path, is output to the decoder 14 through the re-rendering path, and is decoded by the decoder 14. A video signal obtained as a result of the decoding is output to the encoder 15. A frame included in the extraction section within the video signal obtained as a result of the decoding is extracted and encoded again by the encoder 15. The result is output to the rewriting unit 16, and a predetermined parameter is rewritten by the rewriting unit 16. Note that since the bit length of the parameter to be rewritten is restricted by the EPB problem occurrence prevention countermeasures, no EPB problems can occur. Accordingly, smart rendering editing is performed without causing an EPB problem.

Conversely, if it is determined in step S1 that no EPB problem occurrence prevention countermeasures have been taken in the H.264/AVC stream input from the previous stage, the process proceeds to step S4. There may be a case where no EPB problems occur even without EPB problem occurrence prevention countermeasures being taken. Thus, in step S4, smart rendering editing is performed. Then, the process proceeds to step S6 until it is determined in step S5 that the smart rendering editing ends.

In step S6, the rewriting unit 16 determines whether or not an EPB problem has occurred due to the rewriting of the parameter in the process of smart rendering editing. If it is determined that no EPB problems have occurred, the process returns to step S4 and the subsequent processing is repeated. If it is determined in step S6 that an EPB problem has occurred, the process proceeds to step S7.

In step S7, the rewriting unit 16 determines whether the EPB problem that has occurred results from the insertion or elimination of an EPB. If it is determined that the occurrence results from the insertion of an EPB, the process proceeds to step S8. In step S8, the rewriting unit 16 determines whether or not a deletable filler corresponding to at least the inserted EPB is present in the H.264/AVC stream. If it is determined that a filler exists, the process proceeds to step S9, in which the filler corresponding to the inserted EPB is deleted from the H.264/AVC stream. Accordingly, an EPB problem of the occurrence of insertion of an EPB is solved, and the smart rendering editing ends.

If it is determined in step S7 that the EPB problem that has occurred results from the deletion of an EPB, on the other hand, the process proceeds to step S10. In step S10, the rewriting unit 16 determines whether or not a filler corresponding to the deleted EPB can be inserted into the H.264/AVC stream. If it is determined that a filler can be inserted, the process proceeds to step S11, in which a filler corresponding to the deleted EPB is inserted in the H.264/AVC stream. Accordingly, an EPB problem of disappearance of an EPB is solved, and the smart rendering editing ends.

Note that if it is determined in step S8 that a deletable filler corresponding to at least the inserted EPB is not present in the H.264/AVC stream or if it is determined in step S10 that a filler corresponding to the deleted EPB cannot be inserted into the H.264/AVC stream, it is not possible to solve the EPB problem that has occurred. Thus, the smart rendering editing that is currently in progress is waived, and the process proceeds to step S12. In step S12, the smart rendering editing that is currently in progress is stopped, and the entirety of the extraction section is output to the re-rendering path from the switching unit 13 to perform decoding and re-encoding on the entirety of the extraction section. Accordingly, the re-rendering editing ends.

However, also if it is determined in step S8 that a deletable filler corresponding to at least the inserted EPB is not present in the H.264/AVC stream, smart rendering editing may be realized by reducing only an EPB having a redundant parameter or the like inserted therein as far as the standard is not violated.

Here, examples of the redundant parameter to be deleted may include one having flag information which indicates the presence of the parameter. By changing the flag information which indicates the presence of the parameter from 1 (presence) to 0 (non presence), the parameter is regarded as not being present, and the bit length of the parameter can be deleted in a similar manner to a filler.

Another example may be one having bit length information which indicates the bit length of the parameter. By changing bit length information of a certain parameter to a short value, a difference between the original and changed bit lengths can be deleted in a similar manner to a filler.

As explained above, according to the insertion process of the editing apparatus 10, an EPB problem that has occurred when an encoded video signal is subjected to smart rendering editing can be solved, and, when it is not possible to solve the EPB problem, re-rendering editing can be used instead.

Next, a process of setting the bit length of the parameters P1 to P3, which is restricted as EPB problem occurrence prevention countermeasures, will be explained with reference to FIGS. 5 and 6.

Figure 5:
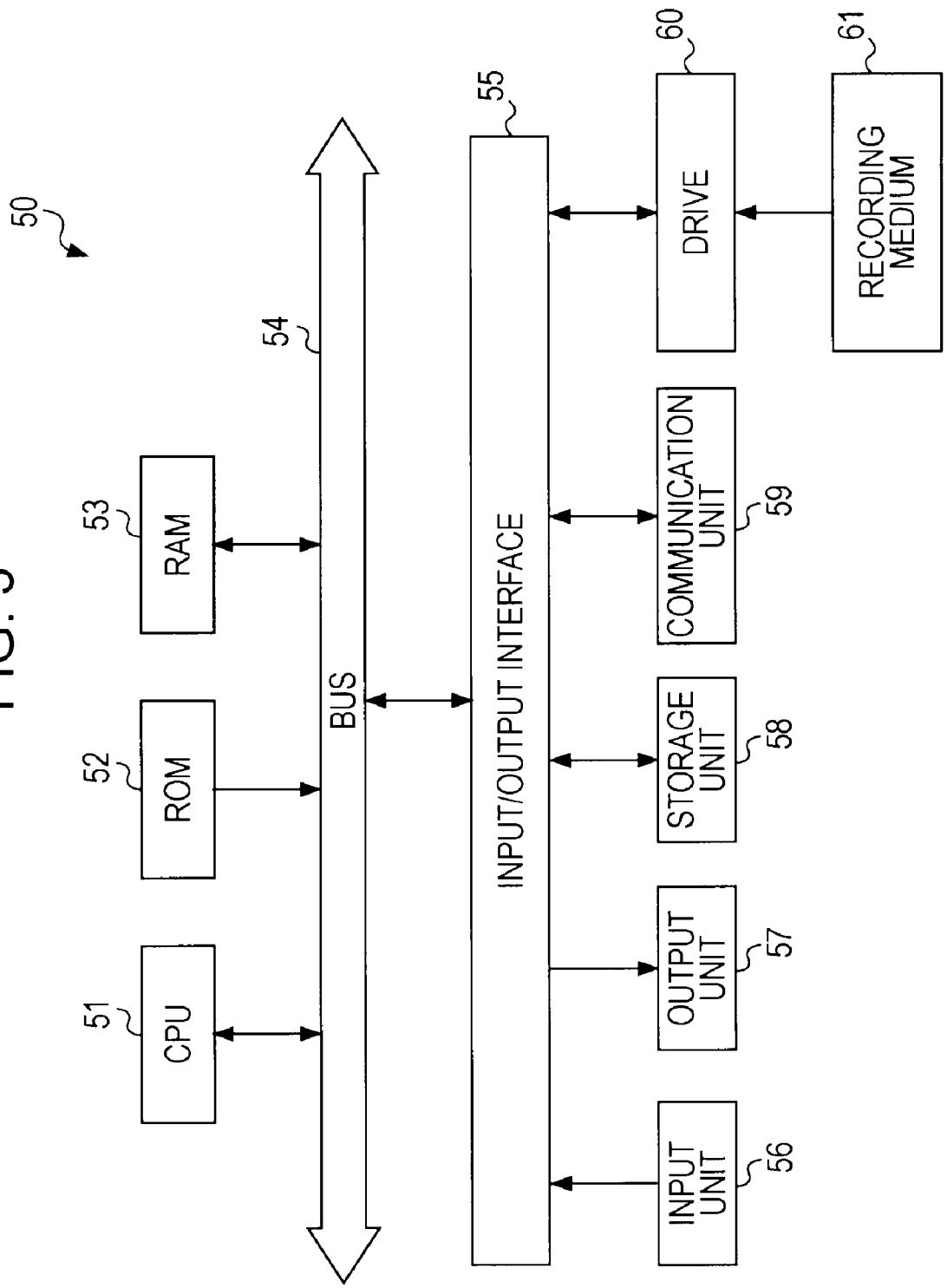
FIG. 5 is a block diagram showing an example structure of a general-purpose personal computer.
Figure 6:
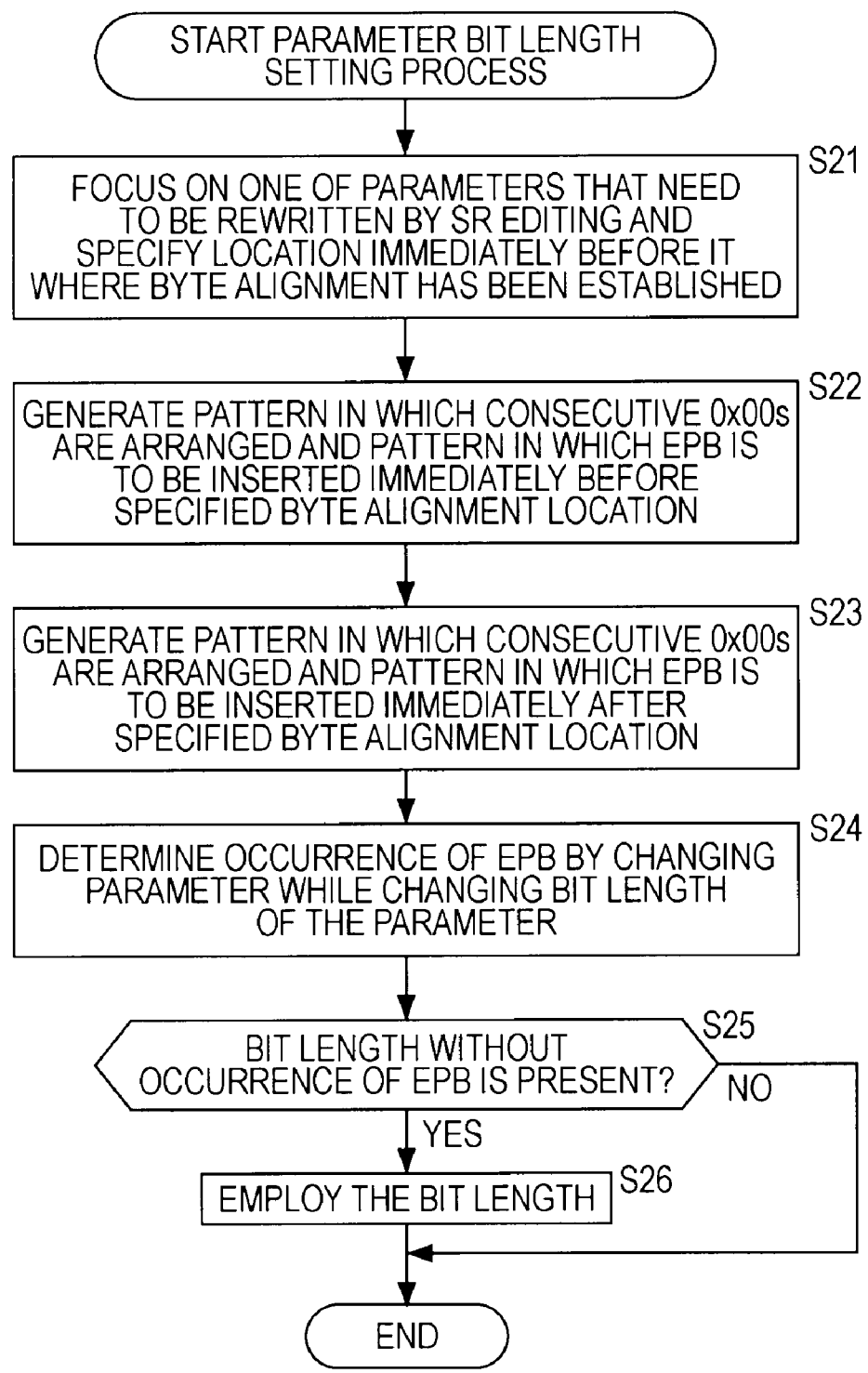
FIG. 6 is a flowchart explaining a parameter bit length setting process as EPB problem occurrence prevention countermeasures.

A process of setting the bit length of the parameters P1 to P3 is implemented by, for example, executing a program by a general-purpose personal computer constructed as shown in FIG. 5.

The personal computer 50 includes a built-in CPU (Central Processing Unit) 51. The CPU 51 is connected to an input/output interface 55 via a bus 54. The bus 54 is connected to a ROM (Read Only Memory) 52 and a RAM (Random Access Memory) 53.

The input/output interface 55 is connected to an input unit 56 including an input device through which a user inputs an operation command, such as a keyboard or a mouse, an output unit 57 including a display on which an operation screen or the like is displayed, such as a CRT (Cathode Ray Tube) display or an LCD (Liquid Crystal Display), a storage unit 58 that stores a program or various data, such as a hard disk drive, and a communication unit 59 that includes a modem, a LAN (Local Area Network) adapter, etc., and that executes a communications process via a network such as the Internet. The input/output interface 55 is further connected to a drive 60 that reads and writes data from and to a recording medium 61 such as a magnetic disk (including a flexible disk), an optical disk (including a CD-ROM (Compact Disc-Read Only Memory) and a DVD (Digital Versatile Disc)), a magneto-optical disk (including an MD (Mini Disc)), or a semiconductor memory.

A program that causes the personal computer 50 to execute a process of setting the bit length of the parameters P1 to P3 is supplied to the personal computer 50 in a state stored on the recording medium 61, and is read by the drive 60 and installed onto a hard disk drive built in the storage unit 58. A program installed onto the storage unit 58 is loaded into the RAM 53 from the storage unit 58 for execution according to an instruction of the CPU 51 corresponding to a command from the user which is input to the input unit 56.

Note that the personal computer 50 can also, in addition to executing a process of setting the bit length of the parameters P1 to P3, encode a video signal according to the H.264/AVC scheme.

Next, a process of setting the bit length of the parameters P1 to P3, which is enabled by executing the program by the personal computer 50, will be explained with reference to a flowchart of FIG. 6. Note that this process is executed for each of the parameters P1 to P3 that need to be rewritten in smart rendering editing. Furthermore, parameters that need to be rewritten in smart rendering editing are not to be limited to the parameters P1 to P3 described above. The following description will be made in the context of the parameter P1 (cpb_removal_delay @ Picture timing SEI).

In step S21, the program executed by the CPU 51 focuses on the parameter P1 in a data string of an H.264/AVC encoded video signal, and specifies a location immediately before the parameter P1 where a byte alignment has been established.

In step S22, the program generates a pattern in which consecutive 0x00s are arranged immediately before the byte alignment location specified in the data string of the H.264/AVC encoded video signal, and picks it up as a pattern to be taken into account. The program further generates a pattern in which an EPB is to be inserted immediately before the byte alignment location specified in the data string of the H.264/AVC encoded video signal, and picks it up as a pattern to be taken into account.

In step S23, the program generates a pattern in which consecutive 0x00s are arranged immediately after the byte alignment location specified in the data string of the H.264/AVC encoded video signal up to immediately before the parameter P1 of interest, and picks it up as a pattern to be taken into account. The program further generates a pattern in which an EPB is to be inserted immediately after the byte alignment location specified in the data string of the H.264/AVC encoded video signal up to immediately before the parameter P1 of interest, and picks it up as a pattern to be taken into account.

In step S24, the program sequentially changes the value of the parameter P1 within a bit length range allowed by the H.264/AVC scheme for each of all combinations of the patterns picked up in the processing of step S22 and the patterns picked up in the processing of step S23, and checks whether or not an EPB could be inserted in accordance with the occurrence of a predetermined data sequence (0x00, 0x00, 0xXX). Note that the bit length range within which the parameter P1 is changed may be limited more than the specification of the H.264/AVC scheme while also taking the shortest bit length or the availability of wraparound of the value of the parameter P1 into account.

In step S25, the program determines whether or not a bit length of the parameter P1 for which the insertion of an EPB in accordance with the occurrence of the predetermined data sequence does not occur is present for any combination of the patterns picked up in the processing of step S22 and the patterns picked up in the processing of step S23 on the basis of the processing of step 24. If it is determined that the bit length of the parameter P1 for which the insertion of an EPB does not occur is present, the process proceeds to step S26, in which this bit length is set to be the bit length of the parameter P1 serving as that of the EPB problem occurrence prevention countermeasures. Then, during encoding, the bit length is reflected in the parameter P1' indicating the bit length of the parameter P1.

Note that if it is determined in step S25 that the bit length of the parameter P1 for which the insertion of an EPB does not occur is not present, step S26 is skipped, and the process ends without setting the bit length of the parameter P1 serving as that of the EPB problem occurrence prevention countermeasures.

Thereafter, the bit lengths of the parameters P2 and P3 are set in a manner similar to that in the explanation described above (or may not be set in some cases).

And, in a case where all the bit lengths of the parameters P1 to P3 have been set, the set bit lengths are reflected in the parameters P1' to P3' contained in the encoded video signal. A smart rendering indicator indicating that EPB problem occurrence prevention countermeasures have been taken is further embedded into the encoded video signal.

Note that, for example, the parameters P1' to P3' indicating the bit lengths of the parameters P1 to P3, respectively, have the following values:

Parameter P1': cpb_removal_deley_length_minus1=15
: dpb_output_delay_length_minus1=5
parameter P2': log 2_max_frame_num_minus4=0
parameter P3': log 2_max_pic_order_cnt_lsb_minus4=0

In the specific example of the parameter P1' described above, two restrictions, namely, 15 and 5, are respectively given because a value obtained by the addition of the value written in dpb_output_delay_length_minus1, which follows immediately after cpb_removal_deley_length_minus1, needs to be less than or equal to 20.

As explained above, according to a parameter bit length setting process, the bit length of the parameters P1 to P3 can be set so that no EPB problems can occur regardless of which value they are changed to.

Note that a process of setting the bit length of the parameters P1 to P3 may be implemented by, as described described above, executing a program by the personal computer 50, and may instead be executed in hardware or software using a digital video camera, video recorder, or the like equipped with a built-in H.264/AVC encoder.

In this specification, steps executed on the basis of a program are to include processes that are executed sequentially in the order described herein, and also include processes that are executed in parallel or individually, not necessarily sequentially.

Note that an embodiment of the present invention is not to be limited to the embodiment described above and a variety of modifications can be made without departing from the scope of the present invention.

The invention claimed is:

1. A video signal processing apparatus that performs smart rendering editing of a section specified in units of frames of an encoded video signal, the apparatus comprising:
    determining means for determining whether EPB (Emulation Prevention Byte) problem occurrence prevention countermeasures have been taken in the encoded video signal which has been input;
    smart rendering editing means for decoding and re-encoding a leading end portion and a trailing end portion of the section specified in units of frames of the encoded video signal which has been input, and outputting an intermediate portion not included in the leading end portion or the trailing end portion of the section directly without decoding the intermediate portion; and
    EPB problem addressing means for detecting occurrence of an EPB problem indicating a first event in which a new EPB is inserted into an edited encoded video signal by rewriting a predetermined parameter in the encoded video signal in accordance with the re-encoding or a second event in which an EPB that has existed before editing disappears, deleting, when the first event has occurred, a filler or predetermined data inserted in advance in the encoded video signal, which corresponds to the inserted EPB, and inserting, when the second event has occurred, a filler corresponding to the EPB that has disappeared into the encoded video signal,
    wherein the processing of the EPB problem addressing means is omitted when it is determined by the determining means that EPB problem occurrence prevention countermeasures have been taken in the encoded video signal which has been input.

2. The video signal processing apparatus according to claim 1, wherein the determining means determines whether the EPB problem occurrence prevention countermeasures have been taken on the basis of information indicating whether the EPB problem occurrence prevention countermeasures have been taken, the information being included in the encoded video signal which has been input.

3. The video signal processing apparatus according to claim 1, wherein the EPB problem occurrence prevention countermeasures include a bit length restriction for the predetermined parameter.

4. A video signal processing method of a video signal processing apparatus that performs smart rendering editing of a section specified in units of frames of an encoded video signal, the method comprising the steps of:
    determining whether EPB (Emulation Prevention Byte) problem occurrence prevention countermeasures have been taken in the encoded video signal which has been input;
    performing, regardless of whether the EPB problem occurrence prevention countermeasures have been taken, smart rendering editing in which a leading end portion and a trailing end portion of the section specified in units of frames of the encoded video signal which has been input are decoded and re-encoded and in which an intermediate portion not included in the leading end portion or the trailing end portion of the section is directly output without being decoded; and
    executing, only when it is determined that the EPB problem occurrence prevention countermeasures have not been taken, an EPB problem addressing process of detecting occurrence of an EPB problem indicating a first event in which a new EPB is inserted into an edited encoded video signal by rewriting a predetermined parameter in the encoded video signal in accordance with the re-encoding or a second event in which an EPB that has existed before editing disappears, deleting, when the first event has occurred, a filler or predetermined data inserted in advance in the encoded video signal, which corresponds to the inserted EPB, and inserting, when the second event has occurred, a filler corresponding to the EPB that has disappeared into the encoded video signal.

5. A non-transitory computer readable medium having instructions recorded thereon that when executed by a processor perform steps for controlling a video signal processing apparatus that performs smart rendering editing of a section specified in units of frames of an encoded video signal, the steps comprising:
    determining whether EPB (Emulation Prevention Byte) problem occurrence prevention countermeasures have been taken in the encoded video signal which has been input;
    performing, regardless of whether the EPB problem occurrence prevention countermeasures have been taken, smart rendering editing in which a leading end portion and trailing end portion of the section specified in units of frames of the encoded video signal which has been input are decoded and re-encoded and in which an intermediate portion not included in the leading end portion or the trailing end portion of the section is directly output without being decoded; and
    executing, only when it is determined that the EPB problem occurrence prevention countermeasures have not been taken, a problem addressing process of detecting occurrence of an EPB problem indicating a first event in which a new EPB is inserted into an edited encoded video signal by rewriting a predetermined parameter in the encoded video signal in accordance with the re-encoding or a second event in which an EPB that has existed before editing disappears, deleting, when the first event has occurred, a filler or predetermined data inserted in advance in the encoded video signal, which corresponds to the inserted EPB, and inserting, when the second event has occurred, a filler corresponding to the EPB that has disappeared into the encoded video signal.

* * * * *